(12) United States Patent
Matzner

(10) Patent No.: US 9,529,072 B2
(45) Date of Patent: Dec. 27, 2016

(54) SEARCH SYSTEM AND METHOD FOR SEARCHING FOR A BURIED PERSON

(71) Applicant: ORTOVOX Sportartikel GmbH, Taufkirchen (DE)

(72) Inventor: Rolf Matzner, Munich (DE)

(73) Assignee: Ortovox Sportartikel GmbH, Taufkirchen (DE)

( * ) Notice: Subject to any disclaimer, the term of this patent is extended or adjusted under 35 U.S.C. 154(b) by 304 days.

(21) Appl. No.: 14/146,524

(22) Filed: Jan. 2, 2014

(65) Prior Publication Data

US 2014/0191901 A1 Jul. 10, 2014

(30) Foreign Application Priority Data

Jan. 4, 2013 (EP) ..................................... 13150268

(51) Int. Cl.
*G01S 3/14* (2006.01)
*G01S 1/08* (2006.01)
(Continued)

(52) U.S. Cl.
CPC .................. *G01S 3/143* (2013.01); *G01S 1/08* (2013.01); *G01S 5/0226* (2013.01); *G01S 19/01* (2013.01); *G01S 3/14* (2013.01)

(58) Field of Classification Search
CPC ............... G01S 1/02; G01S 1/08; G01S 3/02; G01S 3/14; G01S 3/143; G01S 5/02; G01S 5/0205; G01S 5/0226; G01S 19/01; G01S 13/003; G01S 13/02; G01S 13/04; G01S 13/74; G01S 13/88; G01S 13/885; G01S 11/02; G01S 11/06; G01S 7/003; G01S 7/02; G01S 7/024; G01S 7/025; G01S 7/026; G01S 13/0209; G01S 13/06; G01S 13/08; G01S 13/32; G01S 13/34; G01S 13/345; G01S 13/50; G01S 13/52; G01S 13/56; G01S 13/82; G01S 13/89; G01S 13/90; G01V 3/12
(Continued)

(56) References Cited

U.S. PATENT DOCUMENTS 3,234,547 A * 2/1966 Katzin .................... G01S 7/025
342/188
3,665,466 A * 5/1972 Hibbard ................ G01S 13/345
342/22

(Continued)

FOREIGN PATENT DOCUMENTS

CA 2443751 A1 4/2005
DE 102011003154 A1 7/2012
(Continued)

*Primary Examiner* — Bernarr Gregory
(74) *Attorney, Agent, or Firm* — Jura C. Zibas; Robert P. Feinland; Wilson Elser Moskowitz Edelman & Dicker, LLP

(57) ABSTRACT

A search system for searching buried persons is provided including a radio device with a receiving device including at least one receiving antenna and adapted to receive the field of a transmitter antenna, wherein the radio device is adapted to determine the direction of the field vector of the transmitter antenna relative to the at least one receiving antenna; as well as a user interface device with at least one interface for interfacing with the radio device, as well as at least one output device for outputting search information derived from the direction of the determined field vector and perceivable by a user; wherein the radio device and the user interface device are each formed as separate units, which are each encompassed by an own housing, and wherein the search system includes determining means for determining the relative orientation of the user interface device to the radio device. Moreover, it relates to a corresponding method for search a buried person.

20 Claims, 2 Drawing Sheets

(51) Int. Cl.
*G01S 5/02* (2010.01)
*G01S 19/01* (2010.01)
*G01S 3/00* (2006.01)

(58) Field of Classification Search
USPC .... 342/21, 22, 27, 28, 42–44, 175, 188–197
See application file for complete search history.

(56) References Cited

U.S. PATENT DOCUMENTS

| | | | | |
|---|---|---|---|---|
| 3,775,765 A * | 11/1973 | Di Piazza | ........... | G01S 13/0209 342/22 |
| 3,831,173 A * | 8/1974 | Lerner | ................ | G01S 13/0209 342/22 |
| 4,331,957 A * | 5/1982 | Enander | ................. | G01S 13/82 342/22 |
| 4,721,961 A * | 1/1988 | Busignies | ............... | G01S 11/06 342/22 |
| 4,905,008 A * | 2/1990 | Kawano | .............. | G01S 13/0209 342/22 |
| 4,951,055 A * | 8/1990 | Katayama | ................ | G01V 3/12 342/22 |
| 5,130,711 A * | 7/1992 | Kimura | ................... | G01S 7/024 342/22 |
| 5,227,799 A * | 7/1993 | Kimura | ............... | G01S 13/0209 342/22 |
| 5,463,597 A * | 10/1995 | Harley | ................... | G01S 7/003 342/22 |
| 5,499,029 A * | 3/1996 | Bashforth | ........... | G01S 13/0209 342/22 |
| 5,900,833 A * | 5/1999 | Sunlin | ................. | G01S 13/0209 342/22 |
| 6,031,482 A * | 2/2000 | Lemaitre | ................. | G01S 13/56 342/22 |
| 6,771,206 B2 * | 8/2004 | Berthelier | ............... | G01S 3/143 342/22 |
| 7,479,918 B2 * | 1/2009 | Johnson | .................. | G01S 13/90 342/22 |
| 7,893,862 B2 * | 2/2011 | Holly | ..................... | G01S 13/04 342/175 |
| 8,188,745 B2 * | 5/2012 | Overby | .................... | G01V 3/12 342/22 |

FOREIGN PATENT DOCUMENTS

| | | | | |
|---|---|---|---|---|
| EP | 0075199 A1 * | 3/1983 | ............. | G01S 13/04 |
| EP | 1577679 A1 | 9/2005 | | |
| EP | 1785169 A1 | 5/2007 | | |
| FR | 2402453 A1 * | 4/1979 | ............. | G01S 13/04 |
| WO | 2012/107171 A1 | 8/2012 | | |

* cited by examiner

SEARCH SYSTEM AND METHOD FOR SEARCHING FOR A BURIED PERSON

CROSS-REFERENCE TO RELATED APPLICATIONS

This application claims priority from European Application EP 13150268.4, filed Jan. 4, 2013, which is hereby incorporated herein by reference in its entirety.

FIELD

The present invention relates to a search system for searching buried persons including a radio device with a receiving device including at least one receiving antenna and adapted to receive a field of a transmitter antenna, wherein the radio device is adapted to determine the direction of the field vector of the transmitter antenna relative to the at least one receiving antenna, as well as a user interface device with at least one interface for interfacing with the radio device, as well as at least one output device for outputting search information derived from the direction of the determined field vector and perceivable by a user, wherein the radio device and the user interface device are each formed as separate units, which are each encompassed by an own housing. Moreover, it relates to a corresponding method for searching a buried person.

BACKGROUND

A generic search system as well as a generic method is known from WO 2012/107171 A1. The basic intention of such a two-part search system is in that mobile communication terminals, preferably in the form of smart phones, PDAs, etc., can be used as user interface device, thereby considerably increasing the distribution of such search systems for the search of buried persons, in particular for the search of avalanche victims. Therein, it is to be taken into account that basically the location of any type of objects, thus, persons and/or items, can be performed such as for example in case of disaster, upon earthquakes and building collapses, but also to detect persons in panic situations and for example to retrieve escaped children.

Therein, the radio device in particular assumes the functions of transmitting, receiving as well as signal conditioning, while the user interface device in particular assumes the functions of complex calculations, of presentation as well as of sensor technology. A comparable search system is sold by the Girsberger Elektronik AG, Mountain Rescue Technology, Oberdorfstrasse 7, 8416 Flaach, Switzerland, under the designation ARS457.

The two-part configuration of a system for the search of buried persons further offers the advantage that the receiving electronics disposed in the radio device can be operated spatially remotely from the user interface device. Thereby, the sensitivity of the at least one antenna is improved since EMI interferences, which can impair the antenna function and in particular are generated by the optionally present display or the processor of the user interface device, have less effect. In addition, greater and more sensitive antennas can be used since for example with arrangement of the radio device on a waist belt or in a backpack, more installation space is available and weight increase optionally associated with larger antennas is also hardly perceived as disturbing.

However, how it has become apparent, the search with a known generic search system takes longer than with known one-piece search apparatuses. In particular in view of the fact that only a very scarcely dimensioned time window is available in rescue of buried persons such that already a delay of rescue of few minutes can decide on life and death, the object of the present invention is in improving a generic search system and a generic method, respectively, such that a more effective search, that is a search with reduced expenditure of time, is allowed.

SUMMARY

This object is solved by a search system and method as disclosed.

The present invention is based on the following realization: in the two-part configuration of a search system for searching buried persons, the radio device is conveniently carried fixedly connected to the body, for example as a waist belt or as a part of an avalanche backpack etc. In contrast, the user interface device is hand held like a classic avalanche transceiver.

It is well in the behavior of the human being to predominantly turn the head in the direction of his attention and optionally to point to this direction with the hand. Only in the second place, the human being orients his entire body in this direction. With a known generic two-part search system, the search direction is correctly displayed on the output device of the user interface device only if the user interface device is identically oriented as the radio device. For example, if the output device is formed as a display device, on which a represented arrow indicates the search direction, thus, the arrow points at the incorrect direction as soon as the user interface device and the radio device are no longer identically oriented. Unfortunately, this is the case during the predominant time of the search. Wrong ways result from it, which temporally delay or completely prevent the search. According to the invention, this problem is remedied in that the search direction output to the user is determined by the direction, at which the user interface device points, but not by the orientation of the radio device.

According to the invention, the search system therefore includes determining means for determining the relative orientation of the user interface device to the radio device. By the designation of "relative orientation", according to the invention, in particular the plane or spatial angle between at least one reference axis of the user interface device and at least one reference axis of the radio device is to be understood.

Usually, the radio device is developed as a vectorial receiver of the magnetic or electric field of a transmitter antenna. Here, the direction of the field vector is basically measured relative to the orientation of the at least one antenna of the receiving device. In the above presented example, this orientation coincides with the orientation of the entire body, with the orientation of the pelvis in the case of a waist belt, of the searcher. In contrast, in the user interface device, the field vector relative to a fixed reference axis of the user interface device itself has to be known for correct display corresponding to the hand/arm direction of the searcher.

Preferably, the search system is further adapted to combine the relative orientation of the user interface device to the radio device determined by the determining means with the determined direction of the field vector such that the direction of the field vector relative to the orientation of the user interface device can be output via the output device. Preferably, the output device constitutes a display device, in particular a display. However, speakers or light emitting diodes can for example also be provided as the output device in order to supply the searcher with information to the search direction in known manner.

The determining means can be disposed in the user interface device and/or the radio device. In a first preferred variant, the determining means include a first and a second position sensor, wherein the radio device includes the first position sensor and the user interface device includes the second position sensor, wherein the first position sensor is adapted to determine the orientation of the radio device relative to an external alien reference system, wherein the second position sensor is adapted to determine the orientation of the user interface device relative to the same external alien reference system. Therein, the first and the second position sensor are in particular adapted to determine an orientation with respect to the earth's magnetic field, a global or local positioning system, in particular GPS or Galileo. The angle of the field vector relative to the orientation results as the sum of the measured angle of the field vector relative to the radio device and the difference of the orientations of radio device and user interface device with respect to the external alien reference system.

In a second preferred variant, the determining means include means for generating a native reference system as well as at least one position sensor for determining an orientation relative to this native reference system, wherein the means for generating the native reference system are disposed in a first device from the group of the radio device and the user interface device, wherein the position sensor is disposed in the second device from this group. The means for generating a native reference system can be adapted to generate a field, in particular a magnetic or electric field, wherein the means for determining the orientation relative to this native reference system include at least one position sensor adapted to evaluate the field for determining the orientation relative to the native reference system. In this manner, a search system according to the invention can be particularly inexpensively realized. Independently of that, of course, at least one further position sensor can be provided, which is adapted to determine the orientation of the first or the second device relative to an external alien reference system, see above. In this manner, the advantages known from the prior art can also be achieved in the second variant, which are for example in a search system related to the earth's magnetic field in that search information is further output, even if the signal output by the transmitter antenna is lost or obstacles have to be bypassed on the way to the buried person.

With respect to the question, in which of the two devices the conversion of the orientation of the measured field vector into the reference system of the user interface device is performed, according to the invention, various translations can be differentiated:

Case A: The user interface device is adapted to combine the relative orientation of the user interface device to the radio device determined by the determining means with the determined direction of the field vector. In case two position sensors are provided, then, the radio device can be adapted to transmit the orientation determined by the first position sensor to the user interface device, wherein the user interface device is adapted to determine its relative orientation to the radio device. In case means for generating a native reference system as well as at least one position sensor for determining an orientation relative to this native reference system are provided, in a first configuration, the means for generating a native reference system can be disposed in the radio device, wherein the position sensor is disposed in the user interface device, wherein the user interface device is adapted to determine the relative orientation of the user interface device to the radio device. Alternatively, the means for generating a native reference system can be disposed in the user interface device, wherein the position sensor is disposed in the radio device, wherein the radio device is adapted to determine the relative orientation of the user interface device to the radio device and transmit it to the user interface device.

Case B: The radio device is adapted to combine the relative orientation of the user interface device to the radio device determined by the determining means with the determined direction of the field vector. Therein, in case two position sensors are provided, the user interface device can be adapted to transmit the orientation determined by the second position sensor to the radio device, wherein the radio device is adapted to determine its relative orientation to the user interface device. In case means for generating a native reference system as well as at least one position sensor for determining an orientation relative to this native reference system are provided, the means for generating a native reference system can be disposed in the radio device, wherein the position sensor is then disposed in the user interface device, wherein the user interface device is adapted to determine the relative orientation of the user interface device to the radio device and to transmit it to the radio device. Alternatively, the means for generating a native reference system can be disposed in the user interface device, wherein the position sensor is disposed in the radio device, wherein the radio device is adapted to determine the relative orientation of the user interface device to the radio device.

As already mentioned, the output device preferably constitutes a display device, wherein the search information represents direction information, in particular an arrow, reflecting the direction of the field vector of the transmitter antenna related to the orientation of the user interface device. In this manner, it is particularly simply possible for a searcher to capture the search direction in continuous manner, that is virtually in real time, in order to thereby keep the expenditure of time up to detection of the buried person as low as possible.

The respective position sensor can be adapted to two-dimensionally determine the orientation of the respective device in terms of a plane angle. However, it can also be provided that the respective position sensor is adapted to three-dimensionally determine the orientation of the respective device in terms of a spatial angle. In this manner, it can be achieved that a user interface device held obliquely downwards towards a person buried in depth shows an image exactly corresponding to this direction of view even if the searcher stands upright and only holds the arm with the user interface device obliquely downwards. In contrast, in the two-dimensional case, the direction is displayed in the plane of the earth's surface.

Preferably, the first interface constitutes an air interface, in particular a radio interface, or a flexible mechanical interface, in particular a cable interface. In this manner, a particularly high operator convenience is achieved since the user interface device can be moved independently of the radio device.

Further preferred embodiments are apparent from the dependent claims.

The preferred embodiments presented with respect to the search system according to the invention and the advantages thereof correspondingly apply to the method according to the invention if applicable.

BRIEF DESCRIPTION OF THE DRAWINGS

In the following, now, embodiments of the present invention are described in more detail with reference to the attached drawings. There show:

In the drawings, the same reference characters are used for identical and identically operating components. For clarity, they are only once introduced.

FIG. 1 shows in schematic illustration a first embodiment of a search system 10 according to the invention. It includes a radio device R with a receiving device 12 including at least one receiving antenna, preferably three receiving antennas, and adapted to receive the field of a transmitter antenna of a buried person. Field lines 14a, 14b of this field are exemplarily drawn. The radio device R is adapted to determine the direction of the field vector of the transmitter antenna relative to the at least one receiving antenna. The thus determined direction of the field vector is preferably related to a reference axis BA1 of the radio device R. Presently, the angle a reflects the direction of the field vector related to the reference axis BA1 of the radio device R. The search system 10 according to the invention further includes a user interface device UI, which has at least one interface for interfacing with the radio device R. The user interface device UI includes an output device 16, the so-called user interface, for outputting search information perceivable by a user. This search information is derived from the direction of the determined field vector. As is clearly apparent, the radio device R and the user interface device UI are each formed as separate units, which are each encompassed by an own housing.

In the illustrated embodiment, the radio device R includes a first position sensor 18a and the user interface device UI includes a second position sensor 18b. The position sensor 18a is adapted to determine the orientation of the radio device R relative to an external alien reference system, while the position sensor 18b is adapted to determine the orientation of the user interface device UI relative to the external alien reference system. The external alien reference system can for example be the earth's magnetic field, wherein the direction of "north" is schematically denoted by an "N" in FIG. 1. The angle a indicates the orientation of the reference axis BA1 of the radio device R related to magnetic north N. The reference axis BA2 of the user interface device UI forms an angle b with magnetic north N. The angle β indicating the direction of the field vector related to the reference axis BA2 of the user interface device UI can accordingly be calculated as β=(a+α)−b.

Figure 2:
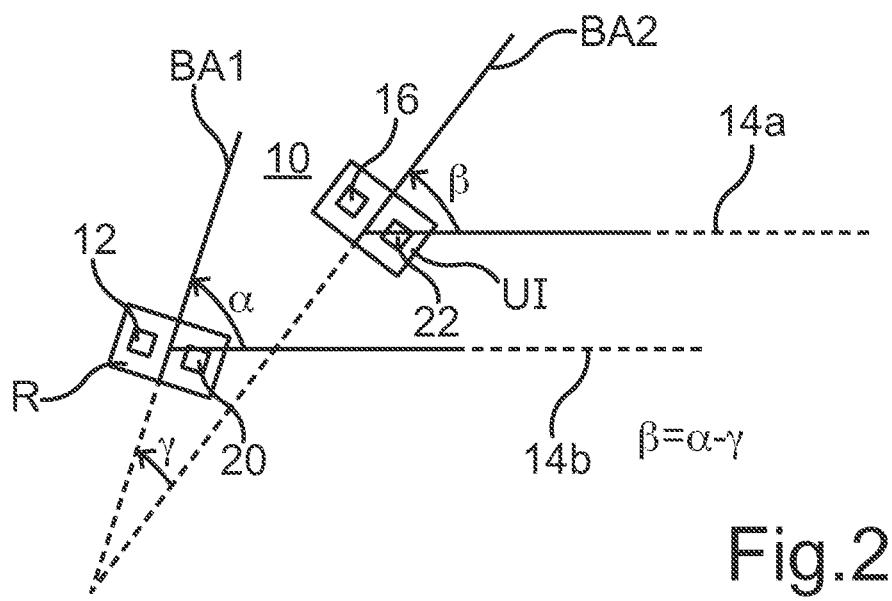
FIG. 2 in schematic illustration a second embodiment of a search system according to the invention, in which a native reference system is generated and evaluated for determining the relative orientation of the user interface device to the radio device.

FIG. 2 shows in schematic illustration a second embodiment of a search system 10 according to the invention, wherein the radio device R includes means 20 for generating a native reference system. The user interface device UI includes a position sensor 22 for determining an orientation relative to this native reference system. The means 20 for generating a native reference system can be adapted to generate a field, in particular a magnetic or electric field. The position sensor 22 can be adapted to evaluate this field for determining the orientation of the user interface device UI relative to the native reference system. Presently, the reference axis BA1 of the radio device R forms the angle α with the field vector, while the reference axis BA1 of the radio device R and the reference axis BA2 of the user interface device UI are oriented relative to each other such that they form the angle γ. Accordingly, the direction of the field vector forms the angle β=α−γ related to the reference axis BA2 of the user interface device UI.

As is evident to the man skilled in the art, the means 20 for generating a native reference system can also be provided in the user interface device UI, while the position sensor 22 is then to be provided in the radio device R. As already mentioned, at least one position sensor can additionally be provided to relate the determined direction of the field vector related to the reference axis BA2 of the user interface device UI to magnetic north N.

Figure 1:
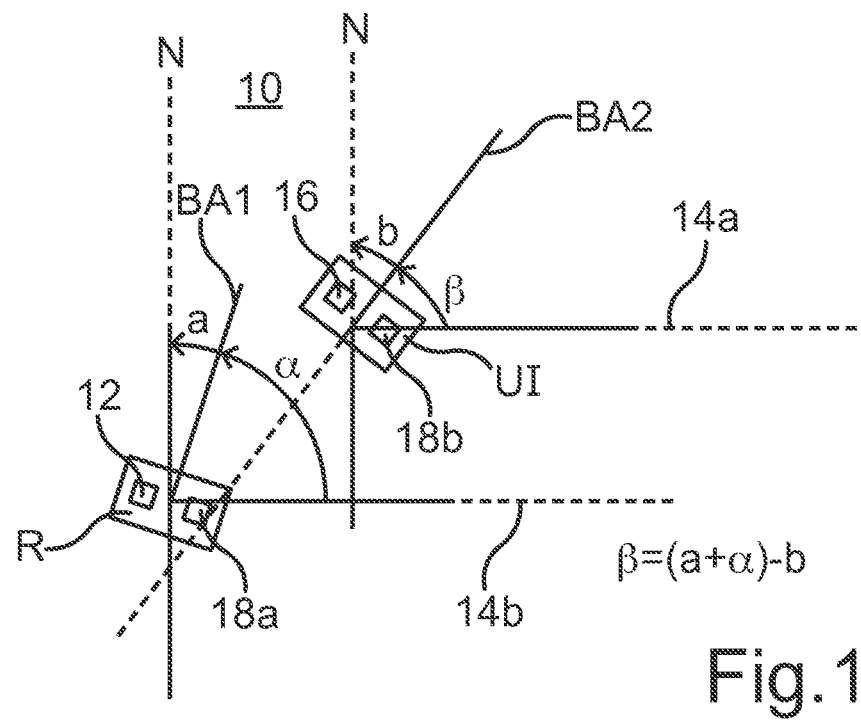
FIG. 1 in schematic illustration a first embodiment of a search system according to the invention, in which both the radio device and the user interface device include a position sensor.
Figure 3:
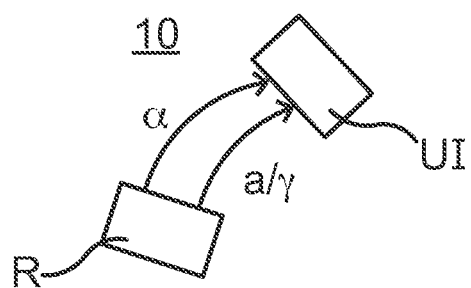
FIG. 3 in schematic illustration a first embodiment for converting the orientation of the measured field vector into the coordinate system of the user interface device.

FIG. 3 shows in schematic illustration a first embodiment with regard to where the conversion of the orientation of the measured field vector into the coordinate system of the user interface device UI is performed. In the illustrated variant, the user interface device UI is adapted to combine the relative orientation of the user interface device UI to the radio device R determined by the determining means 18a, 18b, 20, 22, with the determined direction of the field vector. In the case of FIG. 1, that is both the radio device R and the user interface device UI include a position sensor 18a, 18b for determining the orientation of the respective device relative to an external alien reference system, the radio device R transmits its own measured orientation to the user interface device UI. The user interface device UI calculates the correction factor a−b from the received orientation of the radio device R and the own measured orientation and determines β=a−b+α from it. In case the means 20 for generating a native reference system are disposed in the radio device R and the position sensor 22 is disposed in the user interface device UI, the user interface device UI can itself determine the relative orientation of the user interface device UI to the radio device R. However, if the means 20 for generating a native reference system are disposed in the user interface device UI and the position sensor 22 is disposed in the radio device R, thus, the radio device R is adapted to determine the relative position of the user interface device UI to the radio device R identified by the angle γ. In this case, the radio device R transmits the angle γ to the user interface device UI.

Figure 4:
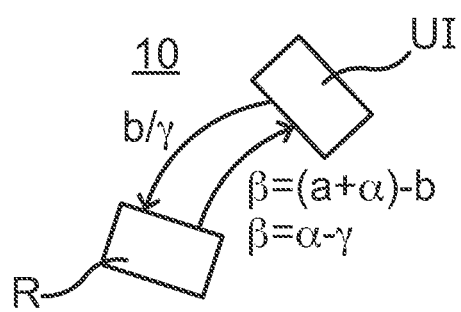
FIG. 4 in schematic illustration a second embodiment for converting the orientation of the measured field vector into the coordinate system of the user interface device.

Alternatively, see FIG. 4, the radio device R can be adapted to combine the relative orientation of the user interface device UI to the radio device R determined by the determining means 18a, 18b, 20, 22 with the determined direction of the field vector. In the case, in which both the user interface device UI and the radio device R include position sensors allowing the orientation of the corresponding device relative to an external alien reference system, the user interface device UI communicates its own orientation b to the radio device R. It calculates the correction factor a−b from the received orientation b of the user interface device UI and the own measured orientation a and communicates the angle β to the user interface device UI.

In case means 20 for generating a native reference system as well as a position sensor 22 for determining an orientation relative to this native reference system are provided, two cases in turn have to be differentiated: if the means 20 for generating a native reference system are disposed in the radio device R, the user interface device UI measures its own orientation γ relative to the coordinate system generated by the radio device R and transmits it to the radio device R. This transmits the angle β=α−γ to the user interface device UI. If the means 20 for generating a native reference system are disposed in the user interface device UI, the radio device R measures its own orientation relative to the coordinate system generated by the user interface device UI and uses it immediately for conversion, that is the radio device R transmits the angle β to the user interface device UI.

As already mentioned, the respective position sensor can be adapted to two-dimensionally determine the orientation of the respective device. Alternatively, it can be provided that the respective position sensor is adapted to three-dimensionally determine the orientation of the respective device. The interface between the radio device R and the user interface device UI is preferably an air interface, in particular a radio interface. Alternatively, it can constitute a flexible mechanical interface, in particular a cable interface.

The invention claimed is:

1. Search system for searching for buried persons, including:
    a radio device with a receiving device including at least one receiving antenna and adapted to receive a field of a transmitter antenna, wherein the radio device is adapted to determine a direction of a field vector of the transmitter antenna relative to the at least one receiving antenna; as well as
    a user interface device with at least one interface for interfacing with the radio device, as well as at least one output device for outputting search information derived from the direction of the determined field vector and perceivable by a user;
    wherein the radio device and the user interface device are each formed as separate units, which are each encompassed by an own housing,
    wherein the search system includes determining means for determining the relative orientation of the user interface device to the radio device.

2. The search system according to claim 1,
    wherein the search system is further adapted to combine the relative orientation of the user interface device to the radio device determined by the determining means with the determined direction of the field vector such that the direction of the field vector relative to the orientation of the user interface device can be output via the output device.

3. The search system according to claim 2,
    wherein the user interface device is adapted to combine the relative orientation of the user interface device to the radio device determined by the determining means with the determined direction of the field vector.

4. The search system according to claim 2, characterized in that the radio device is adapted to combine the relative orientation of the user interface device to the radio device determined by the determining means with the determined direction of the field vector.

5. The search system according to claim 1,
    wherein the determining means are disposed in the user interface device and/or in the radio device.

6. The search system according to claim 1,
    wherein the determining means include a first and a second position sensor, wherein the radio device includes the first position sensor and the user interface device includes the second position sensor, wherein the first position sensor is adapted to determine the orientation of the radio device relative to an external alien reference system, wherein the second position sensor is adapted to determine the orientation of the user interface device relative to the external alien reference system.

7. The search system according to claim 6,
    wherein the first and the second position sensor are adapted to determine an orientation with respect to the earth's magnetic field, a global or local positioning system.

8. The search system according to claim 6,
    wherein the radio device is adapted to transmit the orientation determined by the first position sensor to the user interface device, wherein the user interface device is adapted to determine its relative orientation to the radio device.

9. The search system according to claim 6,
    wherein the user interface device is adapted to transmit the orientation determined by the second position sensor to the radio device, wherein the radio device is adapted to determine its relative orientation to the user interface device.

10. The search system according to claim 6,
    wherein the respective position sensor is adapted to two-dimensionally determine the orientation of the respective device.

11. The search system according to claim 6,
    wherein the respective position sensor is adapted to three-dimensionally determine the orientation of the respective device.

12. The search system according to claim 1,
    wherein the determining means include means for generating a native reference system as well as at least one position sensor for determining an orientation relative to this native reference system, wherein the means for generating the native reference system are disposed in a first device from the group of the radio device and the user interface device, wherein the position sensor is disposed in the second device from this group.

13. The search system according to claim 12,
    wherein the means for generating a native reference system are adapted to generate a magnetic or electric field, wherein the means for determining the orientation relative to this native reference system include at least one position sensor, which is adapted to evaluate the field for determining the orientation relative to the native reference system.

14. The search system according to claim 12,
    wherein the means for generating a native reference system are disposed in the radio device, wherein the position sensor is disposed in the user interface device, wherein the user interface device is adapted to determine the relative orientation of the user interface device to the radio device.

15. The search system according to claim 12,
    wherein the means for generating a native reference system are disposed in the user interface device, wherein the position sensor is disposed in the radio device, wherein the radio device is adapted to determine the relative orientation of the user interface device to the radio device and to transmit it to the user interface device.

16. The search system according to claim 12,
wherein the means for generating a native reference system are disposed in the radio device, wherein the position sensor is disposed in the user interface device, wherein the user interface device is adapted to determine the relative orientation of the user interface device to the radio device and to transmit it to the radio device.

17. The search system according to claim 12,
wherein the means for generating a native reference system are disposed in the user interface device, wherein the position sensor is disposed in the radio device, wherein the radio device is adapted to determine the relative orientation of the user interface device to the radio device.

18. The search system according to claim 1,
wherein the output device constitutes a display device, wherein the search information represents direction information, in particular an arrow, which reflects the direction of the field vector of the transmitting antenna related to the orientation of the user interface device.

19. The search system according to claim 1,
wherein the first interface constitutes an air interface, in particular a radio interface, or a flexible mechanical interface, in particular a cable interface.

20. A method for searching for a buried person by means of a search system (10) characterized by the following steps of:
determining the relative orientation of a user interface device (UI) to a radio device (R);
adapting at least one receiving antenna (12) of a receiving device of said radio device (R) of said search system (10) to receive the field of a transmitter antenna;
adapting said radio device to determine the direction ($\alpha$) of a field vector of the transmitter antenna relative to at least one receiving antenna (12);
interfacing with a user interface device (UI) with at least one interface and with the radio device (R);
outputting search information derived from the direction ($\alpha$) of the determined field vector and perceivable by a user from at least one output device (16); and
wherein the radio device (R) and the user interface device (UI) are each formed as separate units each encompassed by an own housing.

* * * * *